United States Patent [19]
Berger

[11] 3,905,384
[45] Sept. 16, 1975

[54] GAS PROPORTIONER MEANS AND METHOD

[76] Inventor: James E. Berger, 52 Harwich Rd., Newton, Mass. 02167

[22] Filed: Jan. 22, 1974

[21] Appl. No.: 435,417

[52] U.S. Cl............................ 137/111; 137/606
[51] Int. Cl.².......................................... F16K 17/00
[58] Field of Search.................... 137/111, 114, 606

[56] References Cited
UNITED STATES PATENTS

| | | | |
|---|---|---|---|
| 2,583,986 | 1/1952 | Bahnson, Jr. | 137/111 X |
| 3,204,653 | 9/1965 | Hettlinger | 137/111 |
| 3,524,444 | 8/1970 | Ellard | 137/111 X |

*Primary Examiner*—Robert G. Nilson
*Attorney, Agent, or Firm*—Wolf, Greenfield & Sacks

[57] ABSTRACT

An improvement in a fluid proportioner for obtaining a predetermined mixture of two fluids supplied from two different fluid sources. Pressure sensitive means are provided for stopping fluid flow of both said fluids through said proportioner in response to an indication that one of the sources has fallen below a predetermined supply pressure. Preferably first and second flow meters are connected to the first and second fluid sources and bypass means act to cause fluid bypass of the flow meters during normal operation of the fluid proportioner after initial calibration.

4 Claims, 1 Drawing Figure

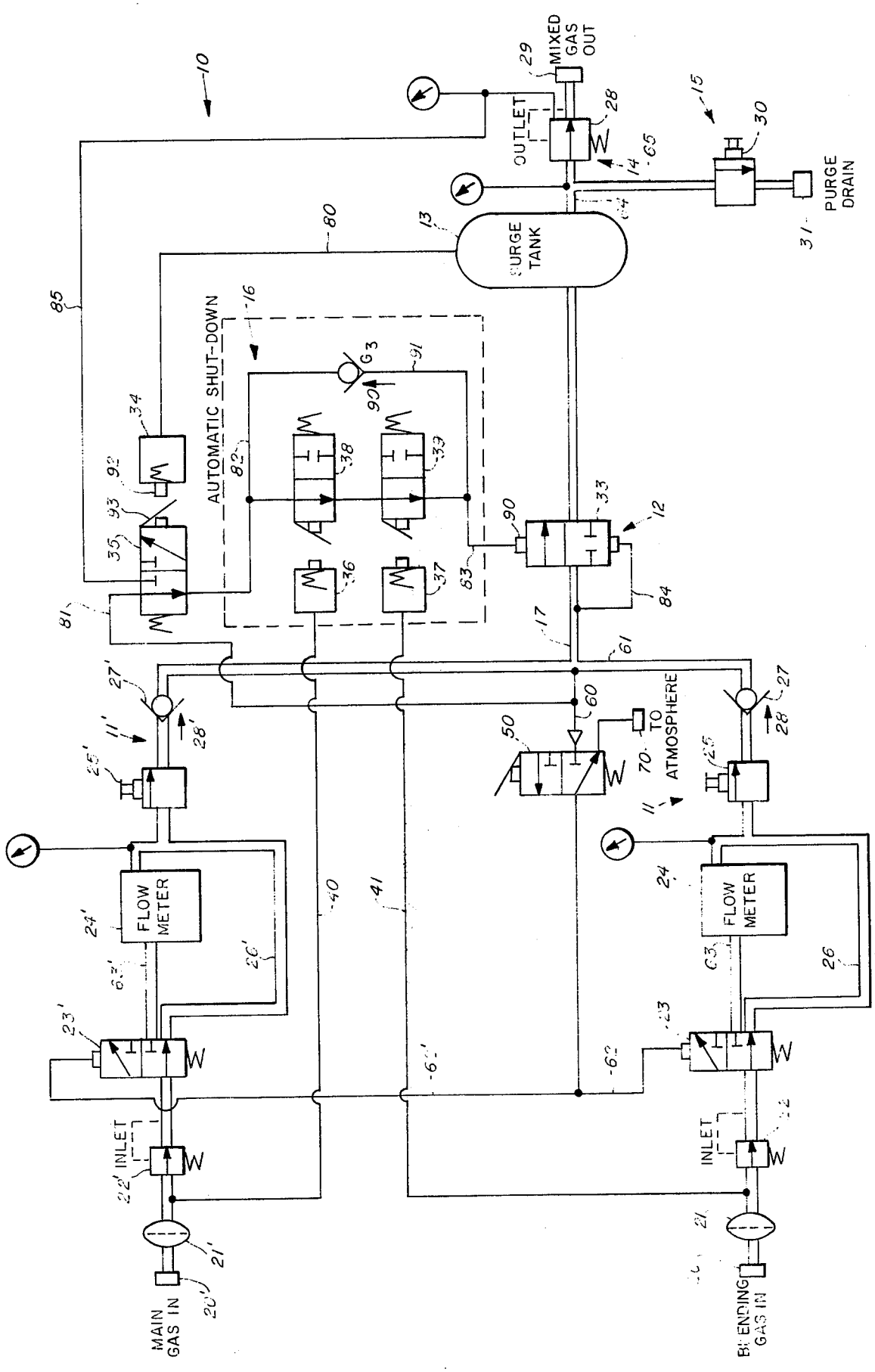

GAS PROPORTIONER MEANS AND METHOD

BACKGROUND OF THE INVENTION

A large number of gas proportioning systems, i.e., systems for providing a predetermined mixture of two or more gases, are known in the art. Often such gas proportioners are electrically operated or regulated making their usage in certain field or other operations complicated because of the need for an electrical supply.

Recently, a gas proportioner which avoids the need for an auxiliary power supply has been developed and marketed. This gas proportioner is described in U.S. Pat. No. 3,677,296 issued July 18, 1972 to the present inventor. The invention of the present application is an improvement over the gas proportioner described in said United States patent.

SUMMARY OF THE INVENTION

It is an object of this invention to provide a fluid proportioner for properly mixing two or more fluids in a predetermined proportion which proportioner carries pressure responsive means for stopping fluid flow of both said fluids through the proportioner in response to an indication that one of two different fluid sources has fallen below a predetermined supply pressure.

Another object of this invention is to provide a gas proportioner in accordance with the preceding object which has an automatic gas flow cutoff which does not require the use of electric power.

Another object of this invention is to provide a gas proportioner in accordance with the preceding objects which incorporates bypass means for reducing wear on flow meters within the proportioner.

Still another object of this invention is to provide a gas proportioner in accordance with the preceding objects which can be easily constructed, requires little or no maintenance over long time periods, and can operate without the need for an auxiliary power source.

According to the invention, a fluid proportioner for obtaining a predetermined mixture of two or more fluids supplied from two or more different fluid sources has pressure sensitive means for stopping fluid flow of both said fluids through the proportioner in response to an indication that one of the sources has fallen below a predetermined supply pressure. Preferably the fluid proportioner has first and second flow meters connected to first and second fluid sources for reading flow therefrom during initial calibration of the fluid proportioner. Preferably bypass means are provided for each flow meter for causing fluid bypass of said flow meters during normal operation of the fluid proportioner after initial calibration.

By the use of the fluid proportioner of this invention, a set ratio of a mixture of two or more gases can be obtained automatically without benefit of any auxiliary power. An automatic shutdown in either of the two or more gas supplies provides for shutdown of the system where one or more of the gases may be at too low a pressure which can be caused by an empty supply cylinder, supply line leakage, stoppage due to dirt or other reasons. The automatic shutdown is particularly important as a safety feature in certain commercial operations. The bypass means used for the flow meters is important to obtain long life for the flow meters. Since the flow meters are only used during calibration of flow, they are not subject to wear and tear or even normal usage during the greatest period of operation of the fluid proportioner.

BRIEF DESCRIPTION OF THE DRAWING

The above and other objects, features and advantages of the present invention will be better understood from the following specification when read in conjunction with the accompanying drawing in which the FIGURE is a diagrammatic representation of a fluid proportioner in accordance with a preferred embodiment of this invention.

DESCRIPTION OF PREFERRED EMBODIMENTS

With reference now to the drawing, a preferred embodiment of a fluid proportioner is illustrated generally at 10 and has first and second supply and mixing sections 11 and 11', an automatic supply control valve means 12, a surge tank 13, an output section 14, a purge section 15 and an automatic shutdown section 16. The gas proportioner 10 is set up to mix and regulate two gases such as argon and helium which may be supplied at the same or different pressures and which are blended, stored in a surge tank 13 and passed out of the system through an output at a constant pressure to a user device (not shown) requiring the uniform mixture of gases at a constant pressure. The automatic shutdown section 16 assures automatic shutdown of the system should either of the two gas supplies drop to a pressure below a predetermined value since such droppage could otherwise cause continued flow of gas through the proportioner and variation in the mixture passing out of the outlet.

The supply and mixing sections 11 and 11' are substantially duplicates of each other and only one section will be fully described. The primed numbers are identical counterparts to their unprimed numbers in the supply and mixing sections. Three or more gases can be mixed by duplicating the elements leading to the common conduit 17. In the drawing, the double lined designations indicate main gas conduits as for example ⅜ inch diameter conduits while the single lines represent pilot conduits as for example ⅛ inch diameter conduits which can be conventional plastic or metal tubing.

Each supply and mixing section for each of the two gases to be mixed has a fluid inlet fitting 20, 20' interconnected with a gas strainer filter 21, 21' passing to an inlet regulator 22, 22' and thence to a three-way poppet valve 23, 23' which has one position permitting passage through flow meter 24, 24' and thence to manual adjusting valves 25, 25', or alternately through conduit 26, 26' to the manual valves 25, 25' where the gas flow passes through a check valve 27, 27' allowing gas flow only in the direction of arrows 28, 28'. The two gases are then blended in a common conduit 17 where the mixed gas passes through the automatic fluid supply control valve means which stops gas flow in one position while allowing gas flow in a second position. When gas flow is permitted through the automatic fluid supply control valve 12, surge tank 13 fills. Gas flow can then be directed through a pressure regulator 28 to a mixed gas outlet fitting 29. The purge drain section 15 comprises a manually operable valve 30 and a purge drain fitting 31 through which gas can be purged from the system.

The automatic fluid supply control valve means 12 includes the two-position valve 33 and a pressure sensitive mechanical actuator 34 operatively associated with a two-position lever actuated valve 35 with suitable conduiting as will be described. The automatic shutdown section 16 comprises mechanical pressure actuators 36 and 37 with associated two-way lever actuated valves 38 and 39 respectively. Mechanical actuators 36 and 37 are interconnected with the gas inlet conduits before the pressure regulators 22' and 22 respectively through pilot conduits 40 and 41 respectively. Thus the mechanical actuators 36 and 37 sense and act in response to gas pressure in the fluid sources connected to the inlets 20 and 20'.

A normally closed pneumatic control valve 50 is preferably manually operated and in the closed position shown releases pilot pressure from the pilot actuators of the poppet valves 23 and 23' to exhaust gas to atmosphere. In the open position, pilot gas pressure is supplied to valves 23, 23' through pilot line 60 to move the valve position to that shown in the Figure.

In a preferred embodiment of this invention, inlet fittings 20 and 20' are connected respectively to an argon gas supply at 200 p.s.i.g. and a helium gas supply at 150 p.s.i.g. Line regulators 22 and 22' are adjusted to provide 95 p.s.i.g. to the main gas conduiting beyond the regulators. The system is first calibrated to obtain a desired gas mixture ratio by allowing the system to presurize. Pilot line 60 directs gas pressure from conduit 61 to the manually operated control valve 50 which is normally closed. Upon manual actuation, control valve 50 supplies gas pressure through pilot lines 62' and 62 to the pressure actuators of three-way valves 23 and 23' which then directs incoming gas from the inlet regulators to flow meters 24 and 24' through conduits 63 and 63'. Calibration pressure in the surge tank 13 is maintained by means of gas flow through conduit 64, to conduit 65, to adjustable manual valve 30, to the purge drain outlet 31. While a predetermined calibration pressure is being held in the surge tank 13, flow adjusting valves 25 and 25' are used to set the ratio of gas mix desired as indicated by the visual reading flow meters 24 and 24' as is known in the art. When a desired ratio has been established, purge valve 30 is closed to stop any further discharge of gases from the surge tank 13. Control valve 50 is then actuated and returned to its normally closed position as shown in the drawing. Valve actuating pressure gas then flows by means of pilot lines 62' and 62 to control valve 50 where it is directed to the atmosphere as at fitting 70. Three-way valves 23 and 23' now direct gas from the inlet regulators 22, 22' to conduits 26, 26' to the previously set adjusting valves 25 and 25'. The use of the bypass means 26, 26' to bypass the flow meters during normal operation permits reduction in wear on the tube and float of each flow meter due to pressure surges which could damage the flow meters used which are of conventional design.

The automatic operation of the major gas flow through the gas proportioner permits mixed gas to be supplied at the outlet fitting 29 at a steady pressure. A conventional regulator 28 is adjusted and set to a predetermined outlet value such as 65 psi in the preferred embodiment. The regulator 28 is supplied by means of conduit 64 from the surge tank 13. When the gas pressure in surge tank 13 drops to a predetermined point such as 70 psi, pressure actuator 34, which senses pressure in the surge tank 13 through pilot line 80, activates the pilot valve of poppet valve 35 to position the valve as diagrammatically shown. Gas pressure is supplied to the valve 35 by means of pilot line 81 which is supplied by conduit 61. Valve 35 directs gas pressure by means of pilot line 82 to valves 38 and 39, in the position shown in the drawing, to pilot line 83 and then to the pilot actuator of the main control valve 33. Main control valve 33 is normally closed due to the pressure supplied by pilot line 84 interconnected with the common conduit 17. Due to area differential of the valve actuator as is known in conventional poppet valves of this type, when pressure is supplied by line 83 the main valve 33 is put into an open position allowing the gas mixture to flow to the surge tank 13.

When the surge tank 13 is filled to a predetermined high pressure such as 90 psi, pressure actuator 34 causes actuation of valve 35 to move to a position where pilot line 82 exhausts through the low pressure side of regulator 28 by means of pilot line 85. Gas is exhausted, by means of pilot lines 83, 82, valves 38 and 39, from the actuating head of the main control valve 33 through pilot line 85 which conducts the gas to the low pressure side of the pressure regulator 28 and then out of the outlet fitting 29. Pressure supplied by pilot line 84 again causes the main control valve 33 to automatically close stopping the flow of gas to the surge tank 13.

The automatic shutdown feature of this invention which provides the safety feature in cutting of all gas supply to the surge tank in response to a lowering of pressure from one of the two or more gas inputs 20, 20', utilizes pressure actuators 36 and 37 which are set at predetermined low shutdown pressures as for example 105 p.s.i.g. for the helium supply and 105 p.s.i.g. for the argon supply. Pressure sensing of the inlet gas lines by means of the pressure sensing pilot lines 40 and 41 enables actuation of either or both pressure sensitive actuators with either or both of the pressure sensitive actuators 36 and 37 capable of cutting down and closing off gas output through the proportioner. If sufficient gas pressure is available on both lines 40 and 41, valves 38 and 39 remain in their normally open condition as shown in the drawing. This allows pilot gas flow to and from valve 35 to the actuator of the main control valve 33 as previously described. Should either inlet gas pressure drop below the predetermined low level of either shutdown actuator 36 or 37, then that actuator sensing that gas line will activate the corresponding valve 38 or 39 and thus stop free flow of pilot gas between the valve 35 and the actuator of the main control valve 33. Should the main control valve 33 be in the open position at the time of closure of 38 or 39, surge tank 13 will continue to fill until that point when the pressure actuator 34 activates the valve 35. Valve actuator operating pressure of the main control valve 33 no longer being allowed to travel through conduit 83 and either valve 38 or 39 or both, must discharge by means of check valve G3 in the direction of arrow 90 using conduit 91 to conduit 82 and conduit 85. When pressure actuator 34 is again activated by low pressure in surge tank 13 and actuates the valve 35 pilot pressure will be directed through pilot line 82 to either 38 or 39 depending upon which one has shifted to a closed position. In any case it is impossible for gas pressure to reach pilot line 83 and thus actuation of the main control valve 33 is prevented. Mixed gas outlet port 29 can supply gas until such time as surge tank 13 is empty. Upon sufficient pressure being supplied to inlet lines 40 and 41, pressure responsive actuators 36 and 37 will allow valves 38 and 39 to return to a normally opened position and allow free pilot gas flow between valve 35 and the actuator of the main control valve 33.

Preferably pressure sensitive actuators 34, 36 and 37 are identical to the pressure sensitive actuators described and shown in U.S. Pat. No. 3,677,296 issued July 18, 1972 which patent is incorporated by reference in this application. Such pressure actuators have a trip arm so that when the value of the gas pressure in line 80 for example builds up beyond a predetermined value such as 90 psi in the preferred example, the actuator 34 moves a trip arm 92 to its extended position to trip a mechanical switching member 93 of the valve 35. Conversely when the line pressure in line 80 falls below a predetermined value such as 70 psi in the preferred example, the trip arm 92 moves to its withdrawn position to permit gas flow to the surge tank. The actuators 34, 36 and 37 as known from said cited patent, and shown in FIGS. 2-5 of said patent, has a first means for reciprocally moving in response to high and low pressure conditions. Spring means are used to determine the high and low pressure conditions and are adjustable to allow for adjustment of the high and low pressure conditions necessary for actuation of the mechanical actuator. Thus the pressures necessary to actuate the mechanical actuators 34, 36 and 37 can be varied as desired by simple mechanical adjustment. The specific structure of the mechanical actuator is described in U.S. Pat. No. 3,677,296 as at column 3 and column 4.

This actuator is preferred because it permits high speed snap movement of mechanical parts of the actuator for rapid actuation. First means move in response to a predetermined low pressure condition in the surge tank and move reciprocally in response to a predetermined high pressure condition in the surge tank. Means for determining the low pressure condition and the high pressure condition are provided with a first arm linked to the first means for movement in response to movement of the first means and a second arm linked to the first arm by a spring whereby predetermined movement of the first arm causes snap movement of the second arm at a predetermined position of the first arm permitting rapid actuation of the second arm at high and low pressure values exerted on the first means.

The flow meters, gauges, line regulators, check valves and tanks are all of conventional design with many substitutes possible. Similarly the automatic supply control valve system can be any control valve system which permits passage of gas when the gas pressure in tank 13 falls below a predetermined value and which shuts off gas flow to the surge tank when the pressure in the tank reaches a predetermined value. These values can be varied greatly depending upon the particular conditions desired. It should be understood that other pressure sensitive actuators and mechanical linkages can be used as may be known in the art. Similarly, the automatic shutdown system of this invention can be used in other fluid proportioner systems to start and stop fluid flow as desired in response to predetermined inlet pressure variations in liquid or gas systems of all types.

In some cases, the specific set up of the automatic shutdown system can vary. For example, valves 38 and 39 can be three-way valves which dump pilot gas to the atmosphere when the mechanical actuator associated with each valve actuates it. In this case, it would not be necessary to employ line 91 and check valve 90. In all cases, valves 38 and 39 must be capable of interrupting flow to valve 33 upon sensing of a predetermined low pressure condition.

The Figure shows standard Joint Industrial Committee symbols (J.I.C.) known in the art for the operation of the valves used. Thus in the poppet valve 23, the lower spring, when actuated, places the valve in the position of the block adjacent the spring and allows flow from the inlet to line 26. When actuated by the pneumatic pilot from line 62, the adjacent block position is assumed and flow from the inlet goes to line 63.

What is claimed is:

1. In a fluid proportioner for obtaining a predetermined mixture of two fluids supplied from first and second different fluid sources, the improvement comprising, pressure responsive means for stopping fluid flow of both said fluids through said proportioner in response to an indication that one of said sources has fallen below a predetermined supply pressure, said pressure responsive means utilizing fluid pressure from said fluid sources for actuation without the need for auxiliary power, said fluid proportioner having first and second flow meters connected to said first and second fluid sources for reading flow therefrom during initial calibration of said fluid proportioner, and bypass means for causing fluid bypass of said flow meters during normal operation of said fluid proportioner after said initial calibration.

2. The improvement of claim 1 and further comprising said pressure responsive means being responsive to an indication that said one source has risen to a predetermined supply pressure to permit fluid flow of both said fluids through said proportioner.

3. In a fluid proportioner for obtaining a predetermined mixture of fluids comprising, at least two fluid inlet conduits, each of said inlet conduits having a flow meter and flow control means, a common conduit interconnecting said inlet conduits and connecting with an automatic fluid supply control valve means for permitting passage of fluid at fluid pressures below a first predetermined low pressure and cutting off fluid flow at a second predetermined pressure higher than said first pressure, said fluid supply control valve means comprising a mechanical actuator responsive to said first fluid pressure and said second fluid pressure for permitting and cutting off fluid flow respectively, a surge tank interconnected with said automatic fluid supply control valve means for receiving fluid from said common conduit through said automatic fluid supply control valve means, said first and second pressures being sensed between said automatic fluid supply control valve means and said surge tank, a tank outlet means for delivering fluid from said tank, a line pressure regulator in said tank outlet means for allowing fluid flow therethrough at a pressure below said second predetermined pressure, the improvement comprising automatic shutdown means for independently permitting or cutting of fluid flow through said fluid supply control valve means in response to fluid pressure sensed in said inlet conduits, said automatic shutdown means being operable solely by fluid pressure without the need for an auxiliary power supply.

4. The improvement of claim 3 and further comprising, said automatic shutdown means comprising, first and second mechanical actuators for operating associated first and second valves aligned in series in a fluid flow path to said fluid supply control valve means whereby fluid flow through said path permits fluid flow through said automatic fluid supply control valve means whereas interruption of fluid flow through said path prevents actuation of said last-mentioned means to its opened position, each of said first and second mechanical actuators of said automatic shutdown means being interconnected with one of said two fluid inlet conduits and being responsive to fluid pressure sensed to stop fluid flow through said fluid path upon reaching a predetermined minimum fluid pressure in said inlet conduit associated with each mechanical actuator and further responsive to raising of fluid pressure in said inlet line to open said gas line.

* * * * *

UNITED STATES PATENT OFFICE
CERTIFICATE OF CORRECTION

Patent No. 3,905,384　　　　　　　　　　　Dated September 16, 1975

Inventor(s)　　　James E. Berger

It is certified that error appears in the above-identified patent and that said Letters Patent are hereby corrected as shown below:

Column 4; line 27, change "of" to --off--.

Column 6; line 64, change "of" to --off--.

Signed and Sealed this

*third* Day of *February 1976*

[SEAL]

*Attest:*

RUTH C. MASON
*Attesting Officer*

C. MARSHALL DANN
*Commissioner of Patents and Trademarks*